(12) United States Patent
Thomasson

(10) Patent No.: US 7,029,364 B1
(45) Date of Patent: Apr. 18, 2006

(54) GEOMETRIC CRAFT AND EDUCATIONAL KIT

(76) Inventor: Daniel E. Thomasson, 7115 Lanark Ct., Charlotte, NC (US) 28217

( * ) Notice: Subject to any disclaimer, the term of this patent is extended or adjusted under 35 U.S.C. 154(b) by 180 days.

(21) Appl. No.: 10/661,071

(22) Filed: Sep. 13, 2003

(51) Int. Cl.
*A63H 33/00* (2006.01)

(52) U.S. Cl. ...................... 446/488; 446/388

(58) Field of Classification Search ............... 434/188, 434/211, 276, 277, 278, 298; 446/109, 115, 446/388, 478, 487, 488
See application file for complete search history.

(56) References Cited

U.S. PATENT DOCUMENTS

| | | | | |
|---|---|---|---|---|
| 4,142,321 A | * | 3/1979 | Coppa | 446/488 |
| 4,310,994 A | * | 1/1982 | Gephardt | 52/608 |
| 4,506,891 A | * | 3/1985 | Alexander et al. | 273/153 S |
| 5,155,951 A | * | 10/1992 | Lalvani | 52/80.2 |
| 5,393,579 A | * | 2/1995 | Witte | 428/9 |
| 6,108,982 A | * | 8/2000 | Davison | 52/64 |
| 6,152,797 A | * | 11/2000 | David | 446/115 |
| 6,523,826 B1 | * | 2/2003 | Matos | 273/155 |

* cited by examiner

*Primary Examiner*—Kurt Fernstrom

(57) ABSTRACT

A geometric craft and educational kit having a punch-out sheet that has cut therein a plurality of faces. Each face is comprised of a plurality of rhombi having two opposite ends, a first end and a second end. The rhombic first ends are connected upon the face. The rhombic second ends are connected to adjacent rhombic second ends upon adjacent faces.

16 Claims, 2 Drawing Sheets

GEOMETRIC CRAFT AND EDUCATIONAL KIT

BACKGROUND OF THE INVENTION

1. Field of the Invention

The present embodiment of the invention relates to a geometric craft and educational kit for use in connection with craft kits. The geometric craft and educational kit has particular utility in connection with craft and educational kit based on a geometric representation of the movement of a chessboard knight.

2. Description of the Prior Art

Geometric craft and educational kits are desirable for assisting geometry educators with teaching the theoretical concepts specific to the direct moves which a knight makes on a chessboard during a closed knight tour. In this context a direct move is the resulting straight line move that would be angular in respect to the chessboard grid, versus the L shaped pattern that results from moving a knight one chessboard square at a time. A closed knight tour refers to the series of moves the knight moves when the knight begins and ends at the same chessboard square. The focus of this invention are simple four move, close knight tours which create three basic polygon shapes, a narrow rhombic, a wide rhombic and a square. These polygons can be tiled to create two and three dimensional shapes and when divided by perimeter lines represent four of the five platonic solids, hexahedron, octahedron, dodecahedron and icosahedron. The modeling set would include precut knight tour polygons for assembly into two and three dimensional shapes.

The use of craft kits is known in the prior art. For example, U.S. Pat. No. 4,310,994 to Gephardt discloses a complementary geometric construction modules, each derived from a rectangular prism, with end faces formed obliquely to each other and to the longitudinal axis of the prism, with the two oblique faces touching each other at a point on the longitudinal edge of the prism. Each module forms a hexahedron, each being the reverse or mirror-shape of the other, and providing bilateral symmetry when the two corresponding faces on the modules, are in full contact with each other. The modules in multiple sets are adapted to be formed into a wide variety of sculptured architectural shapes, unique in appearance. However, the Gephardt '994 patent does not have parts cut to represent knight tour polygons.

Similarly, U.S. Pat. No. 4,682,450 to Diamond discloses a combinate polyhedral model and in particular to a model which can be readily of use in architectural or engineering applications. A new type of complex concave polyhedron is disclosed which is formed from six-sided polyhedron units. However, the Diamond '450 patent does not have parts cut to represent knight tour polygons.

Lastly, U.S. Pat. No. 5,155,951 to Lalvani discloses a building system composed of space-filling saddle zonohedra which fit together periodically and non-periodically into a variety of orderly and irregular looking space structures. The saddle zonohedra are composed of convex or non-convex saddle polygons and are derived from the infinite class of plane-faced zonohedra. The surfaces of the saddle polygons could be continuously curved surfaces or faceted polygonal surfaces derived from minimal surfaces. The curved surfaces could be flexible membranes or nets in tension used by themselves or in combination with space frames, or stiff shell-like surfaces, and the edges of the space frames could be hinged or fixed to others. Applications of the system include architectural and environmental structures, fixed or retractable space frames, decks or platforms, educational kits or toys, curved tiles, and saddle polyhedral nodes for space frames. The building system could be used in extraterrestrial environments where saddle-shaped "floors", surfaces and enclosures provide interesting possibilities. However, the Lalvani '951 patent does not have parts cut to represent knight tour polygons.

While the above-described devices fulfill their respective, particular objectives and requirements, the aforementioned patents do not describe a geometric craft and educational kit that allows craft and educational kit based on a geometric representation of the movement of a chessboard knight. The Gephardt '994, Diamond '450 and Lalvani '951 patents make no provision parts cut to represent knight tour polygons.

Therefore, a need exists for a new and improved geometric craft and educational kit which can be used for craft and educational kit based on a geometric representation of the movement of a chessboard knight. In this regard, the present embodiment of the invention substantially fulfills this need.

In this respect, the geometric craft and educational kit according to the present embodiment of the invention substantially departs from the conventional concepts and designs of the prior art, and in doing so provides an apparatus primarily developed for the purpose of craft and educational kit based on a geometric representation of the movement of a chessboard knight.

SUMMARY OF THE INVENTION

In view of the foregoing disadvantages inherent in the known types of craft kits now present in the prior art, the present embodiment of the invention provides an improved geometric craft and educational kit, and overcomes the above-mentioned disadvantages and drawbacks of the prior art. As such, the general purpose of the present embodiment of the invention, which will be described subsequently in greater detail, is to provide a new and improved geometric craft and educational kit and method which has all the advantages of the prior art mentioned heretofore and many novel features that result in a geometric craft and educational kit which is not anticipated, rendered obvious, suggested, or even implied by the prior art, either alone or in any combination thereof.

To attain this, the present embodiment of the invention essentially comprises a punch-out sheet that has cut therein a plurality of faces. Each face is comprised of a plurality of rhombi having two opposite ends, a first end and a second end. The rhombic first ends are connected upon the face. The rhombic second ends are connected to adjacent rhombic second ends upon adjacent faces.

There has thus been outlined, rather broadly, the more important features of the embodiment of the invention in order that the detailed description thereof that follows may be better understood and in order that the present contribution to the art may be better appreciated.

The present embodiment of the invention may also include a punch out sheet outline vertex. There are, of course, additional features of the present embodiment of the invention that will be described hereinafter and which will form the subject matter of the claims attached.

Numerous objects, features and advantages of the present embodiment of the invention will be readily apparent to those of ordinary skill in the art upon a reading of the following detailed description of presently preferred, but nonetheless illustrative, embodiments of the present embodiment of the invention when taken in conjunction with the accompanying drawings. In this respect, before explaining the current embodiment of the embodiment of the invention in detail, it is to be understood that the embodiment of the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present embodiment of the invention.

It is therefore an object of the present embodiment of the invention to provide a new and improved geometric craft and educational kit that has all of the advantages of the prior art craft kits and none of the disadvantages.

It is another object of the present embodiment of the invention to provide a new and improved geometric craft and educational kit that may be easily and efficiently manufactured and marketed.

An even further object of the present embodiment of the invention is to provide a new and improved geometric craft and educational kit that has a low cost of manufacture with regard to both materials and labor, and which accordingly is then susceptible of low prices of sale to the consuming public, thereby making such geometric craft and educational kit economically available to the buying public.

Still another object of the present embodiment of the invention is to provide a new geometric craft and educational kit that provides in the apparatuses and methods of the prior art some of the advantages thereof, while simultaneously overcoming some of the disadvantages normally associated therewith.

Lastly, it is an object of the present embodiment of the invention is to provide a geometric craft and educational kit for craft and educational kit based on a geometric representation of the movement of a chessboard knight.

These together with other objects of the embodiment of the invention, along with the various features of novelty that characterize the embodiment of the invention, are pointed out with particularity in the claims annexed to and forming a part of this disclosure. For a better understanding of the embodiment of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The embodiment of the invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE PREFERRED EMBODIMENT

Figure 1:
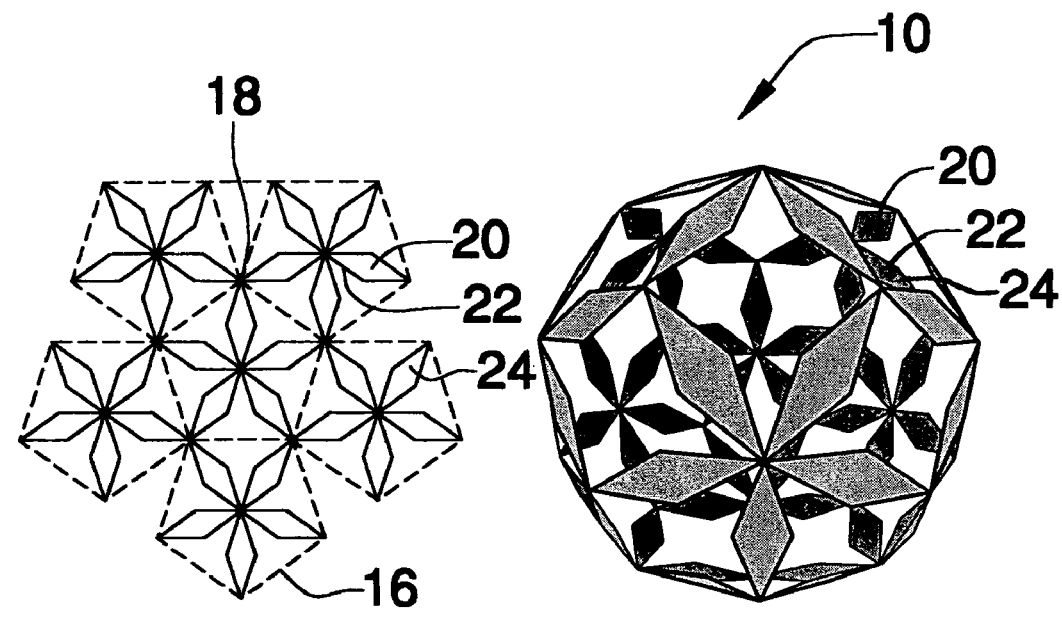
FIG. 1 is a top side view of the preferred embodiment of the geometric craft and educational kit constructed in accordance with the principles of the present invention.

Referring now to the drawings, and particularly to FIGS. 1–4, a preferred embodiment of the geometric craft and educational kit of the present invention is shown and generally designated by the reference numeral 10.

In FIG. 1, a new and improved geometric craft and educational kit 10 of the present invention for craft and educational kit based on the geometric representation of the movement of the chessboard knight is illustrated and will be described. More particularly, the geometric craft and educational kit 10 has a punch-out sheet 12 that has cut therein a plurality of faces 14, the plurality of faces 14 is twelve in the preferred embodiment. Each face 14 has a pentagonal outline 16. The pentagonal outline 16 has a vertex 18. Each face 14 is comprised of a set of five rhombi 20 that have two opposite ends, a first end 22 and a second end 24. The rhombic first ends 22 are connected upon the face 14. The rhombic second ends 24 are connected to adjacent rhombic second ends 24 at the vertex 18 upon adjacent faces 14. In the second embodiment each face 14 has the triangular outline 16. The triangular outline 16 has the vertex 18. Each face 14 is comprised of three rhombi 20 that have two opposite ends, the first end 22 and the second end 24. The rhombic first ends 22 are connected upon the face 14. The rhombic second ends 24 are connected to adjacent rhombic second ends 24 at the vertex 18 upon adjacent faces 14. The number of faces 14 the geometrical craft and educational kit can have in the second embodiment is four, eight or twenty.

Figure 2:
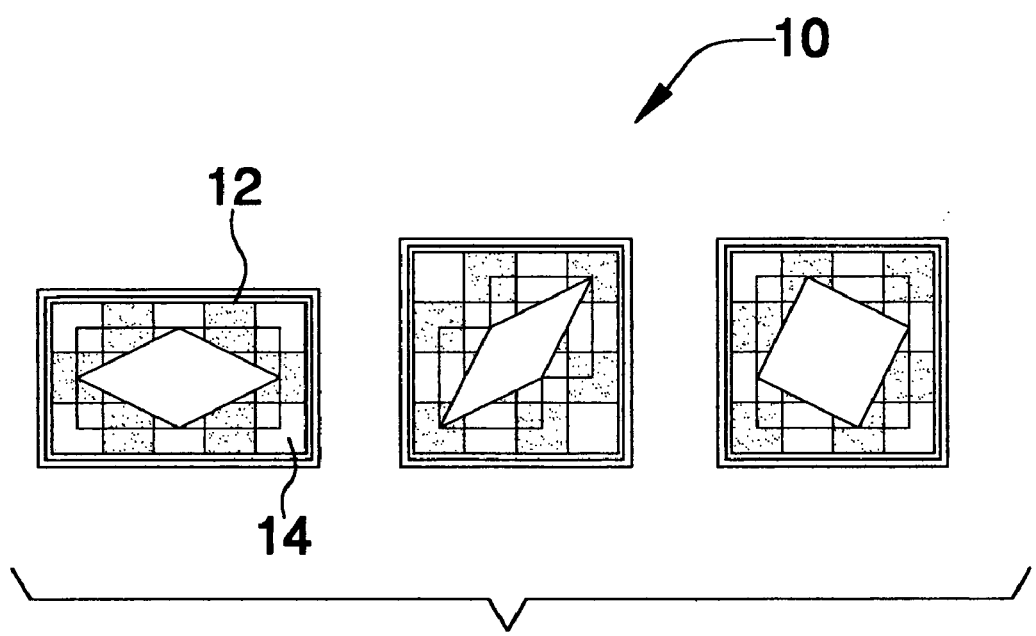
FIG. 2 is a top side view of the geometric craft and educational kit of the present embodiment of the invention.
Figure 3:
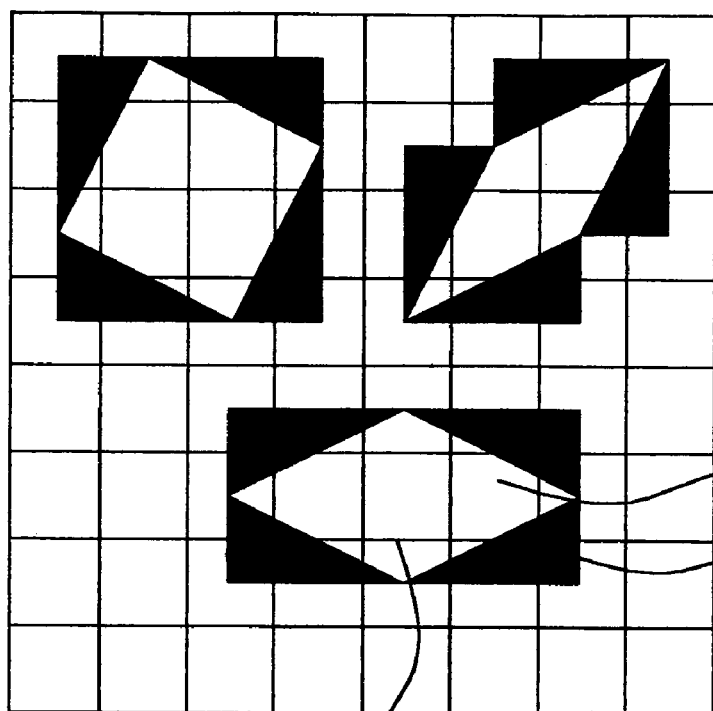
FIG. 3 is a top side view of the geometric craft and educational kit of the present embodiment of the invention.
Figure 4:
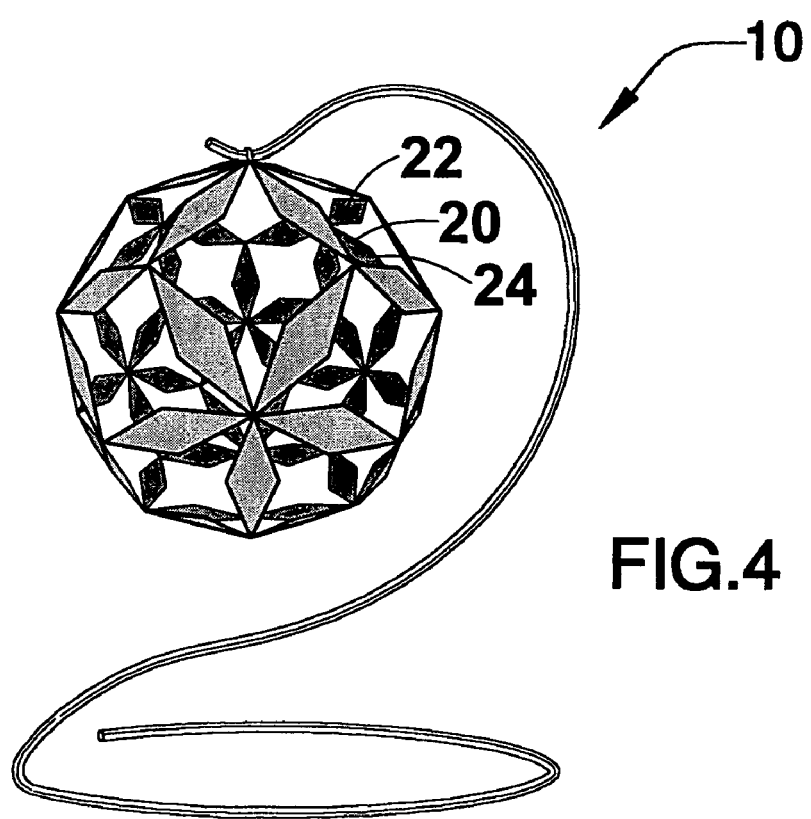
FIG. 4 is a right side view of the geometric craft and educational kit of the present embodiment of the invention.

In FIGS. 2 and 3, the new and improved geometric craft and educational kit 10 is illustrated and will be described. More particularly, the geometric craft and educational kit 10 has the rhombic shape specific to the direct moves that the knight makes on the chessboard during the closed knight tour. In this context the direct move is the resulting straight line move that would be angular in respect to the chessboard grid, versus the L-shaped pattern that results from moving the knight one chessboard square at the time. The closed knight tour refers to the series of moves the knight moves when the knight begins and ends at the same chessboard square. The focus of this invention are simple four move, close knight tours which create three basic rhombic shapes, the narrow rhombic, the wide rhombic and the square. These rhombi's can be tiled to create two and three dimensional shapes and when divided by perimeter lines represent four of the five platonic solids, hexahedron, octahedron, dodecahedron and icosahedron.

In FIG. 3, the new and improved geometric craft and educational kit 10 of the present invention for craft and educational kit based on the geometric representation of the movement of the chessboard knight is illustrated and will be described. More particularly, the geometric craft and educational kit 10 has the punch-out sheet 12 that has cut therein the plurality of faces 14, the plurality of faces 14 is twelve in the preferred embodiment. Each face 14 has the pentagonal outline 16. The pentagonal outline 16 has the vertex 18. Each face 14 is comprised of five rhombi 20 that have two opposite ends, the first end 22 and the second end 24. The rhombic first ends 22 are connected upon the face 14. The rhombic second ends 24 are connected to adjacent rhombic second ends 24 at the vertex 18 upon adjacent faces 14.

While a preferred embodiment of the geometric craft and educational kit has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present embodiment of the invention. For example, any suitable sturdy material such as metal, plastic or wood may be used instead of the cardboard described.

Therefore, the foregoing is considered as illustrative only of the principles of the embodiment of the invention. Further, since numerous modifications and changes will readily occur to those skilled in the art, it is not desired to limit the embodiment of the invention to the exact construction and operation shown and described, and accordingly, all suitable modifications and equivalents may be resorted to, falling within the scope of the embodiment of the invention.

I claim:

1. A geometric craft and educational kit comprising:
a punch-out sheet having cut therein a plurality of faces, each face being comprised of a plurality of rhombi having two opposite ends, a first end and a second end, said rhombic first ends connected upon said face, said rhombic second ends connected to adjacent rhombic second ends upon adjacent faces, said rhombi forming knight tour polygons for assembly into multidimensional shapes.

2. The geometric craft and educational kit of claim 1 wherein:
said faces having three rhombi.

3. The geometric craft and educational kit of claim 1 wherein:
said faces having five rhombi.

4. The geometric craft and educational kit of claim 1 wherein:
said plurality of faces being four.

5. The geometric craft and educational kit of claim 1 wherein:
said plurality of faces being eight.

6. The geometric craft and educational kit of claim 1 wherein:
said plurality of faces being twenty.

7. The geometric craft and educational kit of claim 1 wherein:
said plurality of faces being twelve.

8. The geometric craft and educational kit of claim 1 wherein:
said punch-out sheet is comprised of cardboard.

9. The geometric craft and educational kit of claim 1 wherein:
said punch-out sheet is comprised of plastic.

10. The geometric craft and educational kit of claim 1 wherein:
said punch-out sheet is comprised of paper.

11. A geometric craft and educational kit comprising:
a punch-out sheet having cut therein a plurality of faces, each face having a triangular outline, each said triangular outline having vertices, each face being comprised of three rhombi having two opposite ends, a first end and a second end, said rhombic first ends connected upon said face, said rhombic second ends connected to adjacent rhombic second ends at said vertices upon adjacent faces, said rhombi forming knight tour polygons for assembly into multidimensional shapes.

12. The geometric craft and educational kit of claim 11 wherein:
said plurality of faces being four.

13. The geometric craft and educational kit of claim 11 wherein:
said plurality of faces being eight.

14. The geometric craft and educational kit of claim 11 wherein:
said plurality of faces being twenty.

15. A geometric craft and educational kit comprising:
a punch-out sheet having cut therein a plurality of faces, each face having a pentagonal outline, said pentagonal outline having a vertices, each face being comprised of five rhombi having two opposite ends, a first end and a second end, said rhombic first ends connected upon said face, said rhombic second ends connected to adjacent rhombic second ends at said vertices upon adjacent faces, said rhombi forming knight tour polygons for assembly into multidimensional shapes.

16. The geometric craft and educational kit of claim 15 wherein:
said plurality of faces being twelve.

* * * * *